Patented Sept. 4, 1923.

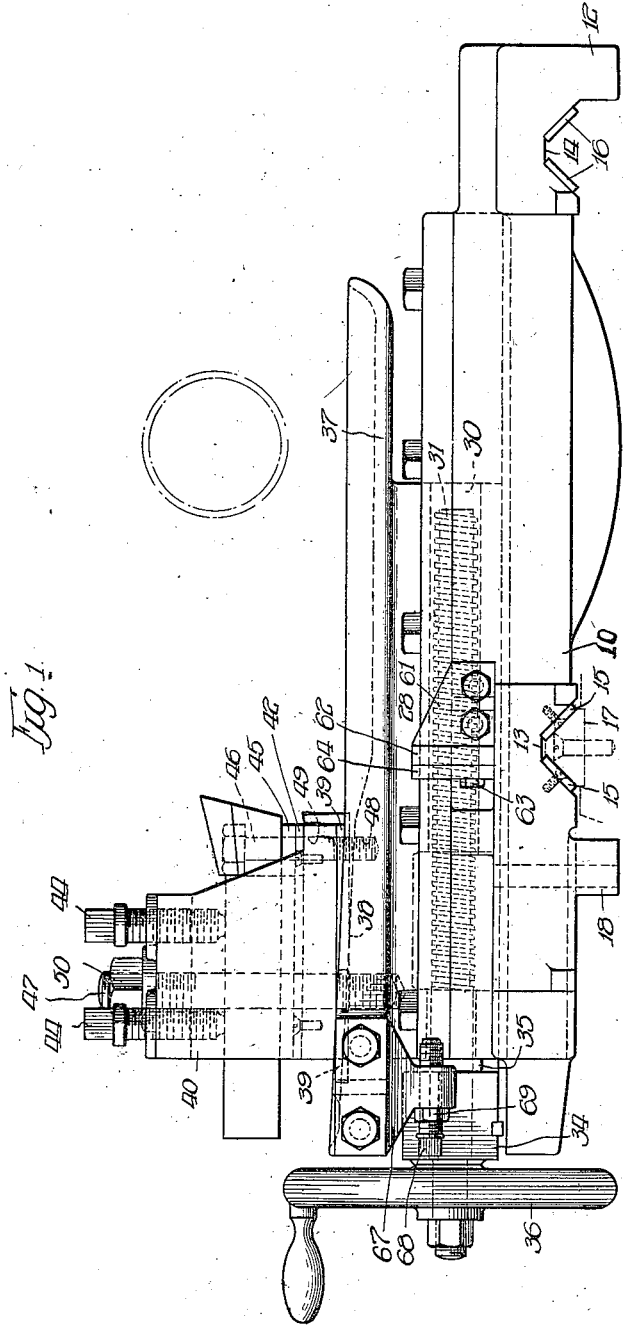

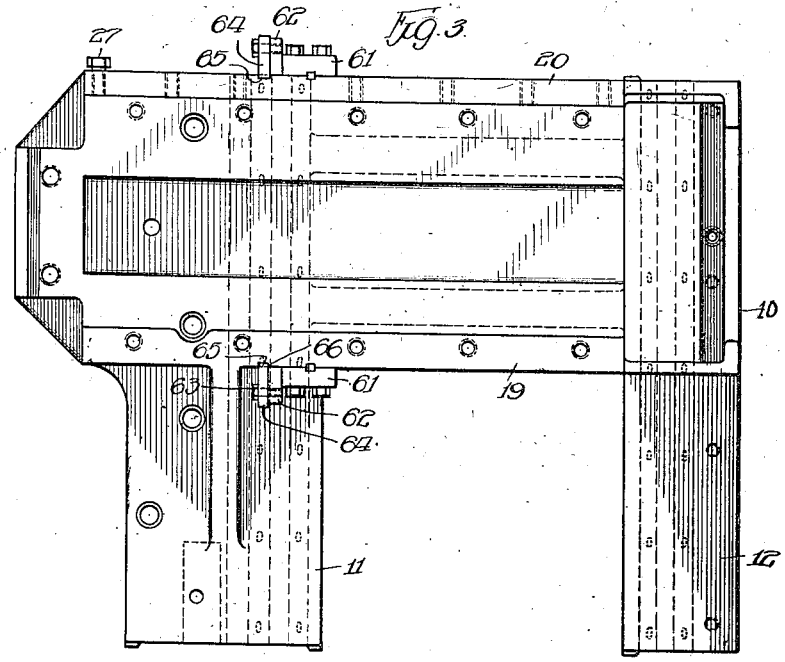

1,467,175

UNITED STATES PATENT OFFICE.

LE ROY KRAMER, OF TOLEDO, OHIO, AND ALEXANDER BOOME, OF CHICAGO, ILLINOIS.

STOP DEVICE FOR LATHES.

Original application filed February 28, 1918, Serial No. 219,551. Now Patent No. 1,394,628, dated October 25, 1921. Divided and this application filed May 5, 1920. Serial No. 378,981.

*To all whom it may concern:*

Be it known that we, LE ROY KRAMER and ALEXANDER BOOME, citizens of the United States, residing, respectively, at Toledo, Ohio, and Chicago, Illinois, have invented certain new and useful Improvements in a Stop Device for Lathes, of which the following is a specification.

This invention relates to lathe tool holders and contemplates particularly a stop device attached thereto whereby to arrest the forward movement of a lathe cross slide at a predetermined point with relation to the lathe carriage, this application being a division of our copending application Serial No. 219,551, Feb. 28, 1918; now Patent No. 1,394,628 dated Oct. 25, 1921.

The primary object of the invention is to provide means in the form of a novel diameter stop designed to limit the travel of the cutting tools as they are presented to the work, and thus insure an accurate final positioning of the tools for action on the work in accordance with the predetermined diameter to be imparted thereto.

Another object is to provide means with which a fine adjustment of the final position of the tools may readily be made.

A further object is the provision of means whereby the stop device is easily thrown out of functioning engagement in case for any reason it should become desirable to further reduce the diameter of the work a small amount by advancing the cutting tools slightly past the arbitrary limit set by the stop device.

Additional objects and advantages of the invention will appear as the nature thereof is clearly set forth and illustrated in the following detailed description and drawings. It should be understood however that the above mentioned description and drawings are designed to illustrate the principle of the invention and not unnecessarily limit the scope of the appended claims.

In the drawings

Fig. 1 is a side elevation of a tool holder constructed in accordance with the present invention, parts being slightly broken away;

Fig. 2 is an end view of the tool block, cross slide and carriage, the latter being slightly broken away; and Fig. 3 is a top plan view of the carriage.

Referring now in detail to the accompanying drawings, the numeral 10 designates the carriage of a metal turning lathe, which carriage partakes generally of the construction of carriages usually found in such machines. In order to adapt the same, however, to the peculiar needs which arise in connection with the turning of car axles it is necessary to impart to the carriage a high degree of rigidity and strength, thereby to afford proper stability to the carriage and support for the tools. To this end, the carriage 10 is provided with a pair of parallel laterally projecting webs 11 and 12, arranged, respectively, at the front and rear ends of the carriage 10, said webs being provided with guide grooves 13 and 14, respectively, the sides of which are arranged in divergent relation. Wear strips 15 and 16, respectively, are applied to the sides of said grooves 13 and 14, and by referring to Figure 3 it will be observed that the guide grooves 13 and 14 extend throughout the entire width of the carriage 10 and receive slideways 17 carried by the bed of the machine and on which the wear strips 15 and 16 work. One of these slideways is illustrated in dotted lines in Figure 1, it being unnecessary to illustrate further parts of the machine bed.

At the underside of the body 10 is a depending apron 18 for supporting the feed gears.

The upper side of the bed 10 is provided with longitudinally-extending marginal upwardly-directed flanges 19 and 20 to which are applied retaining strips 21 and 22, respectively, said strips 21 and 22 being of greater width than the width of the flanges 19 and 20, and thereby overhanging the inner edges of said flanges. This provides guides for the cross slide, to be hereinafter described, and thus insures proper movement of the slide as it traverses the carriage 10. The strip 21 is held in position on the flange 19 by a plurality of cap screws 23, which screws are threaded into said flange 19, while the strip 22 is likewise held in position on the flange 20 by a plurality of cap screws 24. These screws 24 take into the body of the carriage 10 and pass through slots 25 formed in a gib 26 which is arranged at the inner side of the flange 20 and interposed between the retaining strip 22 and the body of the carriage 10. The gib 26 may be adjusted inwardly by means of a plurality of screws 27, or their equivalents, to compensate for any wear which may arise in connection with the movement of the cross slide to be now referred to.

The numeral 28 designates the hereinbefore mentioned cross slide having at opposite sides of its base portion outstanding flanges 29 which fit beneath the retaining strips 21 and 22, the cross slide being thus held upon the carriage 10 but adapted to freely move in the guides formed beneath the retaining strips 21 and 22 and between the flanges 19 and 20. Extending lengthwise of the slide 28 is a bore 30 which receives an adjusting screw 31. At a point intermediate the ends of the bore 30 the latter is enlarged to provide a downwardly opening polygonal pocket or recess 32, which pocket or recess 32 receives a polygonal nut 33 the bore of which is screwthreaded to fit the threads of the adjusting screw 31. It will thus be apparent that the cross slide may be moved in either direction in the carriage 10 upon proper rotation of the screw 31. The forward end of the adjusting screw 31 is rotatably mounted within a head block or bracket 34 suitably bolted to the forward end of the carriage 10, and said adjusting screw is held against longitudinal movement in said block 34 through the medium of a fixed collar 35, which is carried by the screw 31 and arranged at the inner side of the block 34, and a hand wheel 36, of standard construction, which is arranged at the outer face of said block 34 and suitably secured to said screw 31. Thus, upon suitable operation of the hand wheel 36 the cross slide is caused to traverse the carriage 10.

The upper portion of the cross slide 28 is enlarged to provide a dished receptacle or pan 37 for receiving the cuttings, but the forward end of said pan 37 is provided with a raised support 38 the surface of which is flattened, and surrounded by a plurality of guide strips 39 which are suitably secured to said support 38. A socket or pocket is thus provided at the support 38 for receiving a tool-supporting block 40. The pocket formed by the guide strips 39 is substantially rectangular in form, and said tool-supporting block 40 is correspondingly shaped and of such dimensions as to snugly fit within the space between the guide strips 39. Thus it will be seen that when the tool-supporting blocks 40 are placed upon the support 38 and fitted between the guide strips 39, the same will be afforded a firm and stable mounting upon the cross slide 28.

The block 40 is provided with a plurality, preferably two, of tool-receiving openings 41 which extend lengthwise of the block 40, the bottom of each opening 41 being provided with a wear strip 42 suitably secured therein, and preferably case hardened to afford the greatest resistance to wear. Upon the wear strip 42 the tools 43 are mounted, as clearly illustrated in Fig. 2 each of said tools being properly held within the openings 41 by means of a plurality of set screws 44. If it be desired to raise the tools 43 above the wear strip 42 the same may be accomplished by the interposition of shims or spacing strips 45.

It is, of course, necessary that when the block 40 is placed upon the tool slide 28 the same shall be held in firm position on the support 38. This is accomplished by two instrumentalities, to wit; a centering pin 46 and an anchoring stud 47. The centering pin 46 enters a threaded opening 48 which is formed in the support 38 at the rear end thereof, said pin 46 being received by an opening 49 formed at the rear end of the block 40 and adapted to register with the opening 48. When this registration has been effected the centering pin 46 may be passed through the opening 49 and screwed into the opening 48, thus serving to hold the tool supporting block 40 in proper position within the space between the strips 39. The relation of the centering pin 46, is, obviously, a removable one with respect to the cross slide 28 in order to permit removal of the tool supporting block 40 when such is desired. The anchoring post 47 rises upwardly from the forward end of the support 38 and is screw threaded at its upper end for receiving a fastening nut 50. At the forward end of the block 40 is formed a U-shaped socket 51 which receives the anchoring post 47 when the block 40 is placed upon the cross slide 28. When so assembled the upper end of the anchoring post extends above the top of the tool supporting block 40, the diameter of the fastening nut 50 being sufficient to overlap the edges of the socket 51, thus permitting, when the fastening nut 50 is properly operated, a binding engagement between the fastening nut and the tool supporting block, and thereby locking the latter on the support 38.

As has been previously stated, the invention contemplates primarily the provision of means designed to limit the movement of the tools as they are presented to the work and thus insure the accurate position of the tools in accordance with the predetermined diameter to be imparted to the work. The means by which this is accomplished are illustrated clearly in the accompanying drawings. Such means comprise a stop block 61 which is suitably connected to each side of the carriage 10 at predetermined points, so as to be held in fixed relation to the movement of the cross slide 28. Each of these stop blocks is provided with an outstanding foot 62 to which is connected, as by a bolt 63, or its equivalent, a stop proper 64. The stop proper 64 has a nose 65 which fits within a groove 66 arranged in the contiguous portion of the carriage 10. Mounted at each side of the forward end of the slide 28 is a bracket 67 in which a set screw 68 is threadably mounted, and thus capable of adjustment within said bracket 67, and said set screw 68 may be held in this position of adjustment by means of a locking nut 69 associated therewith. It will be understood that the screw 68 is so adjusted in the supporting bracket 67 that when the end of said screw contacts with the stop proper 64 the cutting edges of the tools 43 will have approached the axle to the proper position for insuring the diameter of cut to be imparted to the axle. When these diameters vary in accordance with the different diameters of axles, the screws 68 will be set from time to time so as to provide for the presentation of the cutters in the manner above referred to.

The stop proper 64 has a loose pivotal connection with the bolt 63, and if occasion demands the same may be swung thereon so as to remove the nose 65 of the stop proper from the groove 66. When the stop proper is swung in this manner it is removed from the path of forward movement of the set screw 68, so that the cross slide 28 may be advanced toward the work to a greater extent than when the stop proper is in the immediate path of the set screw.

It will thus be seen that by proper manipulation of the hand wheel 36 the cross slide 28 is advanced to the work, and the tools presented to the axle for the roughing operation. The set screw 68 of the diameter stop having been properly adjusted, the forward movement of the cross slide 28 is arrested by contact of the screw 68 with the stop proper 64. The longitudinal feed of the lathe is now thrown in, and when the required length of cut has been made such feed is discontinued by the usual mechanism of the lathe. Obviously, therefore, when the advance movement of the tools to the work is checked by the diameter stop hereinbefore described, the cutting tools are in proper position for imparting to the axle or other work a cut in accordance with the predetermined diameter for which the stop device has been adjusted.

We claim:

1. In a lathe tool holder, the combination with a cross slide, of tool-holding means associated with said slide, and means for arresting movement of the tool-holding means at a predetermined point in the advance thereof with respect to the work, said cut-limiting means including a stop movable transversely of the line of advance of the tool-holding means and backed up rigidly at a point in alignment with the application of pressure thereto when in its operative position.

2. In a lathe tool holder, the combination with a cross slide, of tool-holding means associated with said slide, and variable means for arresting movement of the tool-holding means at a predetermined point in the advance thereof with respect to the work, said cut-limiting means including a stop movable transversely of the line of advance of the tool-holding means and backed up rigidly at a point in alignment with the application of pressure thereto when in its operative position.

3. In a lathe tool holder, the combination with a carriage, of a cross slide mounted thereon and movable with respect thereto, tool-holding means associated with said slide, a stop associated with said carriage and movable transversely of the line of advance of the tool-holding means, and means associated with said cross slide and cooperating with said stop for arresting movement of the slide at a predetermined point in the advance thereof with respect to the work, said stop being backed up rigidly at a point in alignment with the application of pressure thereto when in its operative position.

4. In a lathe tool holder, the combination with a carriage, of a cross slide mounted thereon and movable with respect thereto, tool-holding means associated with said slide, a stop pivotally mounted on said carriage to move transversely of the line of advance of the tool-holding means, and means associated with said cross slide and cooperating with said stop for arresting movement of the slide at a predetermined point in the advance thereof with respect to the work, said stop being backed up rigidly at a point in alignment with the application of pressure thereto when in its operative position.

5. In a lathe tool holder, the combination with a carriage, of a cross slide mounted thereon and movable with respect thereto, tool-holding means associated with said slide, a stop interlocked with said carriage when in its operative position at a fixed point in the line of advance of the tool-holding means and pivotally mounted to move transversely of said line of advance out of its interlocked engagement, and variable means associated with said cross slide and cooperating with said fixed stop for arresting movement of the slide at a predetermined point in the advance thereof with respect to the work.

6. In a lathe tool holder, the combination with a carriage, of a cross slide mounted thereon and movable with respect thereto, tool-holding means associated with said slide, a fixed stop pivotally mounted on said carriage to move transversely of the line of advance of the tool-holding means and backed up rigidly at a point in alignment with the application of pressure thereto when in its operative position, a bracket carried by said slide, and a set screw adjustably mounted in said bracket and adapted to cooperate with said fixed stop for arresting movement of the slide at a predetermined point in the advance thereof with respect to the work.

7. In a lathe tool holder, the combination with a cross slide and means for advancing the same with respect to the work, of tool-holding means associated with said slide, and means for arresting movement of the tool-holding means at a predetermined point in the advance thereof with respect to the work, said cut-limiting means including a plurality of stops movable transversely of the line of advance of the tool-holding means and disposed on both sides of the slide-advancing means to prevent torsion on the latter in a plane of its advance upon the stops functioning as such.

8. In a lathe tool holder, the combination with a cross slide and means for advancing the same with respect to the work, of tool-holding means associated with said slide, and means for arresting movement of the tool-holding means at a predetermined point in the advance thereof with respect to the work, said cut-limiting means including a plurality of stops movable transversely of the line of advance of the tool-holding means from operative positions wherein they are rigidly backed up and disposed on both sides of the slide-advancing means to prevent torsion on the latter in a plane of its advance upon the stops functioning as such.

In testimony whereof we have hereunto signed our names in the presence of two subscribing witnesses.

LE ROY KRAMER.

Witnesses for Kramer:
W. E. BORNHOFT,
M. L. DANNELLS.

ALEXANDER BOOME.

Witnesses for Boome:
ROBERT W. DERNALD,
H. F. SEIDLER.